(12) United States Patent
Baekelandt

(10) Patent No.: US 7,340,808 B2
(45) Date of Patent: Mar. 11, 2008

(54) DUAL STAGE VEHICLE INTERIOR TRIM FASTENER

(75) Inventor: Matthew Baekelandt, Pontiac, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 108 days.

(21) Appl. No.: 11/311,972

(22) Filed: Dec. 19, 2005

(65) Prior Publication Data

US 2007/0137004 A1   Jun. 21, 2007

(51) Int. Cl.
*F16B 13/06* (2006.01)
*E04F 19/02* (2006.01)
*F16B 13/00* (2006.01)

(52) U.S. Cl. .......................................... 24/453; 24/458
(58) Field of Classification Search .................. 24/453, 24/457, 458; 280/728.2; 411/44, 48, 508, 411/509
See application file for complete search history.

(56) References Cited

U.S. PATENT DOCUMENTS

| | | | | |
|---|---|---|---|---|
| 4,122,583 A | * | 10/1978 | Grittner et al. ............ | 24/703.1 |
| 4,312,614 A | * | 1/1982 | Palmer et al. ................ | 411/44 |
| 5,028,187 A | * | 7/1991 | Sato ............................ | 411/48 |
| 5,460,401 A | | 10/1995 | Gans et al. | |
| 6,234,515 B1 | | 5/2001 | Iwanaga | |
| 6,334,750 B1 | * | 1/2002 | Hsieh .......................... | 411/508 |
| 6,431,585 B1 | | 8/2002 | Rickabus et al. | |
| 6,526,634 B1 | * | 3/2003 | Hsieh .......................... | 24/458 |
| 6,565,116 B1 | | 5/2003 | Tajima et al. | |
| 6,804,864 B2 | | 10/2004 | Kirchen et al. | |
| 6,813,865 B2 | | 11/2004 | Peterson | |

* cited by examiner

*Primary Examiner*—Robert J. Sandy
(74) *Attorney, Agent, or Firm*—MacMillan, Sobanski & Todd, LLC

(57) ABSTRACT

A fastener for retaining a trim panel to a vehicle frame member includes a shank having a first end and a second end. The first end is adapted to be connected to the trim panel and the second end is adapted to be inserted into an opening provided in the frame member. A primary locking element is attached to the shank and operable to cooperate with the opening in the frame member for retaining the trim panel in a normal position. The primary locking element is configured to release from the opening when a sufficient outward force is applied to the trim panel. A secondary locking element is attached to the shank for retaining the second end of the shank in the opening in the frame member and supporting the trim panel in an extended position spaced apart from the frame member after the primary locking element has been released.

13 Claims, 4 Drawing Sheets

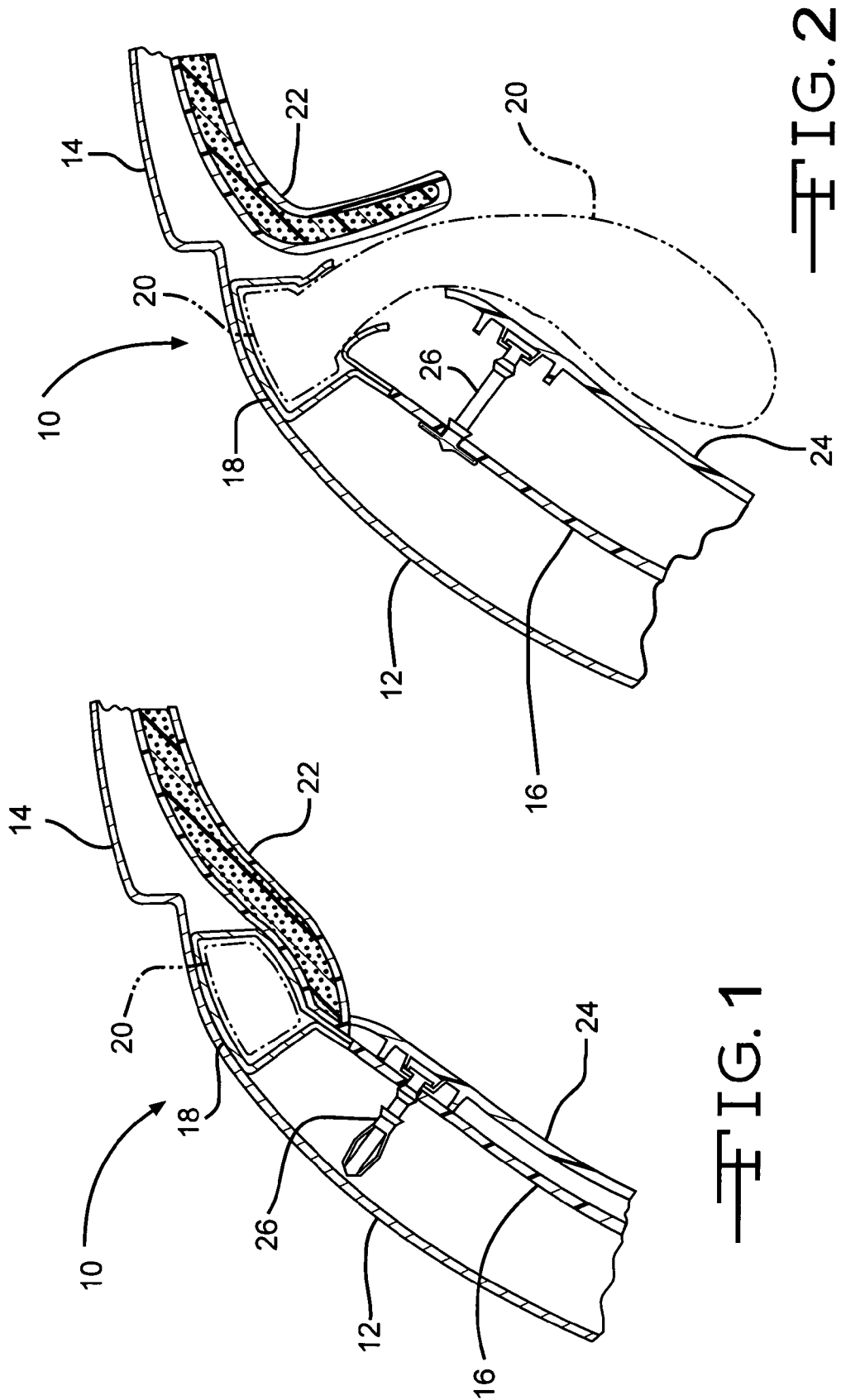

DUAL STAGE VEHICLE INTERIOR TRIM FASTENER

BACKGROUND OF THE INVENTION

This invention relates in general to fasteners for vehicle interior trim panels, and in particular, to a fastener which is operable to allow movement of a trim panel during an air bag deployment.

Many passenger vehicles include inflatable restraints in the form of air bags for vehicle occupants. Air bag assemblies typically include an inflater and reaction canister located behind an interior trim component, such as a headliner, trim panel, steering wheel cover, etc. For the air bag to deploy, the trim component must either move out of the way of the air bag or rupture to allow the air bag to pass through. In the case of the movable trim panel, the trim panel is typically attached with a fastening arrangement that allows the trim panel to move yet still be restrained so that the trim panel does not become a hazard for the occupants when the air bag is deployed. For example, U.S. Pat. No. 6,431,585 discloses a dual stage fastener for securing a vehicle interior trim component to a vehicle body component, the fastener including a pin tethered to a grommet, the disclosures of which are herein incorporated by reference.

BRIEF SUMMARY OF THE INVENTION

This invention relates in particular to a vehicle trim fastener for securing a trim panel in a vehicle, where the trim panel is operable to move in a guided and controlled manner during an air bag deployment.

A fastener for retaining a trim panel to a vehicle frame member includes a shank having a first end and a second end. The first end is adapted to be connected to a trim panel and the second end is adapted to be inserted into an opening provided in a vehicle frame member. A primary locking element is attached to the shank and operable to cooperate with the opening in the vehicle frame member for retaining the trim panel in a normal position. The primary locking element is configured to release from the opening when a sufficient outward force is applied to the trim panel. A secondary locking element is attached to the shank for retaining the second end of the shank in the opening in the vehicle frame member and supporting the trim panel in an extended position spaced apart from the vehicle frame member after the primary locking element has been released.

A fastener for retaining a trim panel to a vehicle frame member includes a shank having a first end and a second end. A trim panel connector is fixed to the first end of the shank. A flange is fixed about the shank between the first end and the second end. A collar is slidably disposed about the shank between the flange and the second end. An arm has a first end and a second end. The first end of the arm is connected to the collar. The second end of the arm is connected to the shank.

Various objects and advantages of this invention will become apparent to those skilled in the art from the following detailed description, when read in light of the accompanying drawings.

BRIEF DESCRIPTION OF THE DRAWINGS

FIG. 1 is a schematic view of a section of a vehicle including an air bag module, a headliner and a trim panel, showing the trim panel mounted to a frame member a trim fastener in accordance with the present invention.

FIG. 2 is a view of the section of FIG. 1 showing the configuration of the headliner and the trim panel after an air bag deployment.

DETAILED DESCRIPTION OF THE PREFERRED EMBODIMENT

Figure 3:
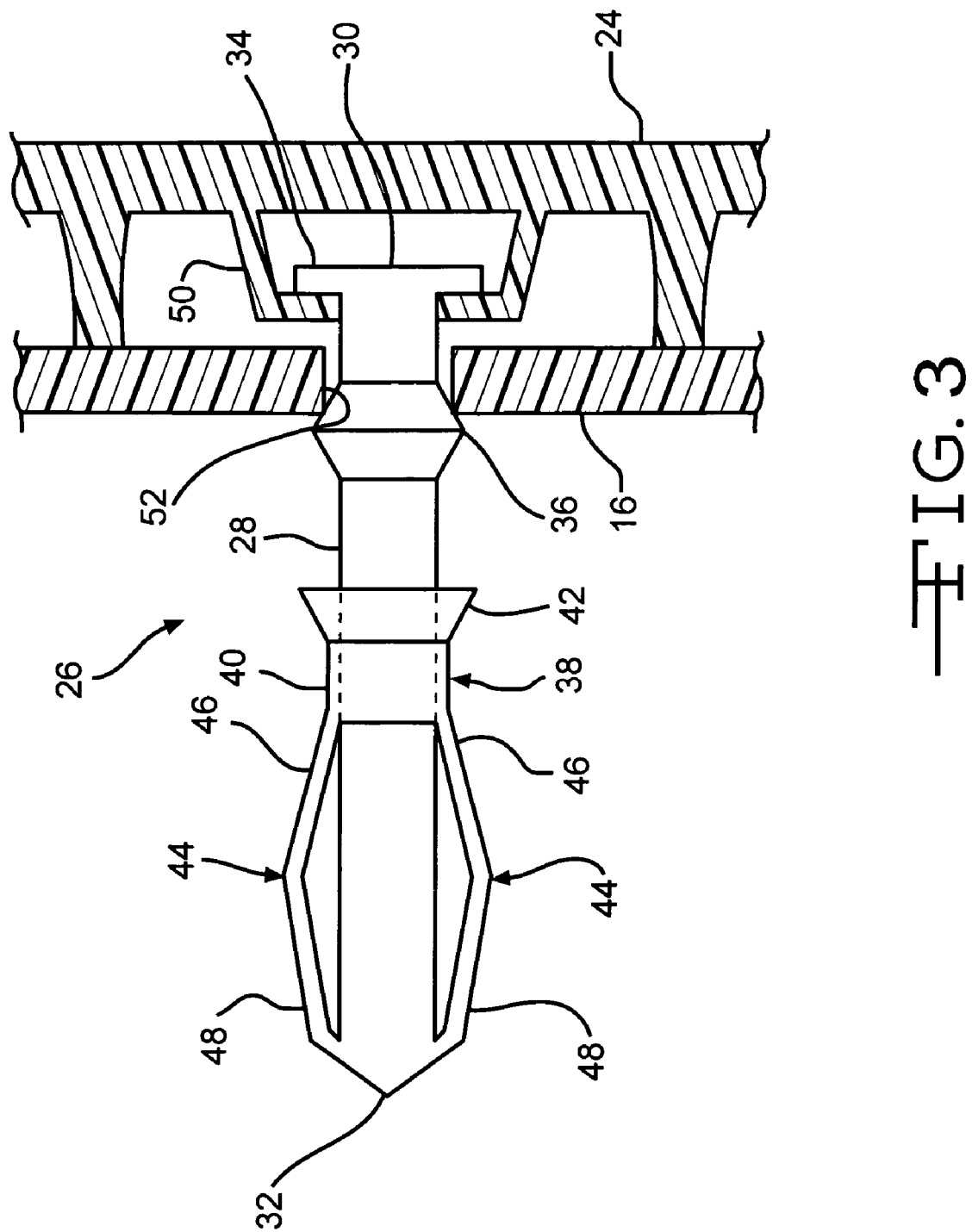
FIG. 3 is an enlarged view, partially in section, of a portion of the section of FIG. 1, showing the trim fastener in the normal position.

Referring now to the drawings, there is illustrated in FIG. 1 a section of a vehicle, indicated generally at 10. The section 10 is generally a cross-section of an upper side portion of automobile. The illustrated vehicle section 10, in large measure, conventional in the art and is intended merely to illustrate one environment in which this invention may be used. Thus, the scope of this invention is not intended to be limited for use with the specific structure for the vehicle section in FIG. 1 or with this specific vehicle section. On the contrary, as will become apparent below, this invention may be used in any desired environment for the purposes described below.

The vehicle section 10 includes an exterior side body panel 12 and an exterior roof panel 14. A frame member 16 is provided for the structural integrity of the vehicle and/or the mounting of vehicle components. The frame member 16 is a side pillar, for example the pillar between the front and rear doors of a four-door vehicle.

An air bag module 18 containing an air bag 20 is disposed within the side body panel 12 and the exterior roof panel 14. A headliner 22 is mounted within the vehicle to conceal the exterior roof panel 14, the air bag module 18, and/or any other roof mounted vehicle components from the view of a vehicle occupant. A trim panel 24 is mounted to the frame member 16 by fasteners 26 to conceal the frame member 16 from the view of a vehicle occupant.

As best shown in FIG. 2, when the air bag 20 is deployed, the headliner 22 and the trim panel 24 are pushed out of the way. This deployment will be further discussed below.

While the fastener 26 has been described in conjunction with the trim panel as part of a trim assembly of interior side panels, e.g., for use with the air bag module 18 as a side curtain air bag, it must be understood, however, that the fastener 26 may be used in conjunction with a trim assembly in any suitable location within the vehicle. For example the frame member 16 may be any suitable frame member such a front "A" or "B" pillar (for corner air bags), a headliner mounting structure (for over-head air bags), a front/dash mounting structure (for front air bags), a door frame member (for side air bags), of any other suitable frame member.

As best shown in FIG. 3 the fastener 26 has a shank 28 having a first end 30 and a second end 32. A trim panel connector 34, in the form of a head, is fixed to the first end 30. It must be understood that the trim panel connector 34 may be any suitable mechanism for engaging the trim panel 24, as will be further described below.

A primary locking element in the form of an annular flange 36 is fixed about the shank 28 between the first end 30 and the second end 32. As will be further described below, the flange 36 is suitable to cooperate with the trim panel connector 34 to normally retain the trim panel 24 to the vehicle frame member 16 in a first position, as shown in FIG. 3.

A collar 38 is slidably disposed about the shank 28 between the flange 36 and the second end 32. The collar 38 has a generally cylindrical main body 40 and a truncated conical portion 42 with an enlarged diameter base facing toward the flange 36, the purpose of which will be described below.

Figure 4:
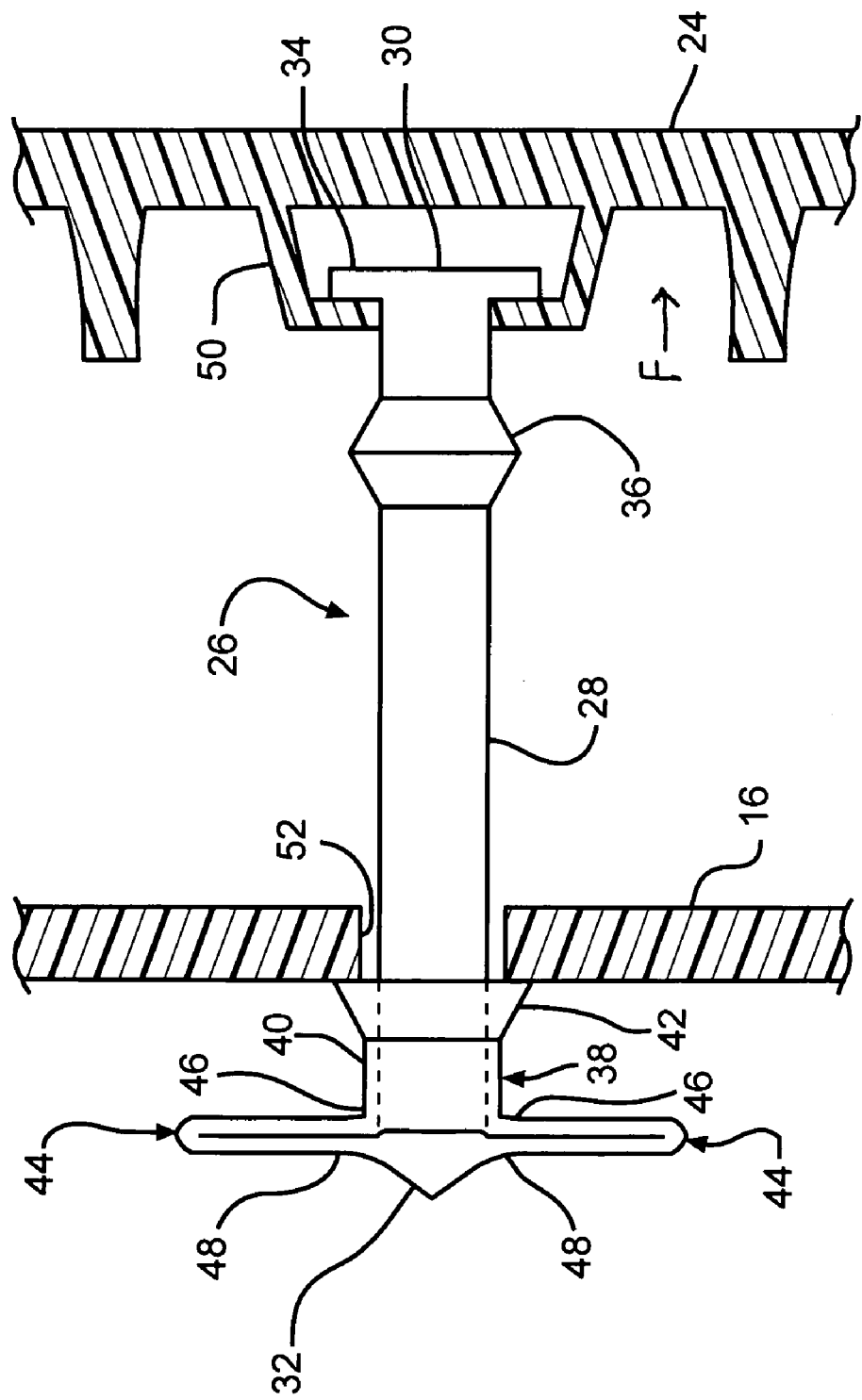
FIG. 4 is a view similar to FIG. 3, except showing the trim fastener in the intermediate position.

Each of a pair of arms 44 has a first end 46 and a second end 48. The first end 46 is connected to the collar 38 and the second end 48 is connected to the shank 28 near or at the second end 32 of the shank 28 such that when sufficient force F, as shown in FIG. 4, is applied to move the trim panel 24 away from the frame member 16 the shank 28 is pulled outwardly from the aperture 52, and the collar 38 is shifted axially toward the second end 32, thereby moving the arms 44 to retain the trim panel 24 to the frame member 16 in a second position, as shown in FIG. 5, as will be further described below.

As shown in FIG. 3, the trim panel 24 is mounted upon the vehicle frame member 16 by the fastener 26. The fastener 26 in the normal position, i.e. Operable to retain the trim panel 24 to the vehicle frame member 16 under normal operating conditions of the vehicle. The trim panel 24 is attached to the fastener 26 by the connector 34. In the present example, the trim panel 24 includes a housing 50 that cooperates with the connector 34, e.g., head. It must be understood, however, that the connector 34 and any cooperating structure of the trim panel 24 may be any suitable attachment arrangement. For example, the connector 34 may be a threaded shaft at the first end 30 with a corresponding threaded bore in the trim panel 24 for receiving the threaded shaft. Additionally, the connector 34 may be a weld, adhesive arrangement, or any other suitable attachment arrangement. The frame member 16 includes an aperture 52. The aperture 52 is formed to be generally the same size or larger than the size of the shank 28, while being smaller than the size of the flange 36 and the base of the collar 42. During installation, the shank 28 is pressed through the aperture 52. The arms 44, collar 38, and the flange 36 compress as necessary to pass through to the other side and then re-expand to a position as shown in FIG. 3. To this end the fastener 26 may be formed from a resilient plastic material; it must be understood, however, that the fastener 26 may be made of any suitable material as to compress and expand through the aperture 52 and have the strength required to mount the trim panel 24. The flange 36 then requires a sufficient amount of force to be withdrawn through the aperture 52 and the fastener 26 thus normally retains the trim panel 24 to the frame member 16.

During deployment of the air bag 20, the headliner 22, and in turn the trim panel 24 will be pushed out of the way to allow for the deployment. The force of the air bag is sufficient for the flange 36 to be withdrawn from the aperture 52. Preferably, the aperture 52 is within reasonably close tolerance to the shank 28 to provide guidance as the shank 28 is withdrawn through the aperture 52. As the shank 28 is withdrawn, the base of collar 38 engages the vehicle frame member 16, as shown in FIG. 4. The collar 38 provides further guidance to the shank 28 and extends the arms 44 into a second position as the fastener 26 moves into the intermediate position as shown in FIG. 4 as the sufficient force of the air bag deployment applied to the trim panel, directly or indirectly, in a direction away from the frame member.

Figure 5:
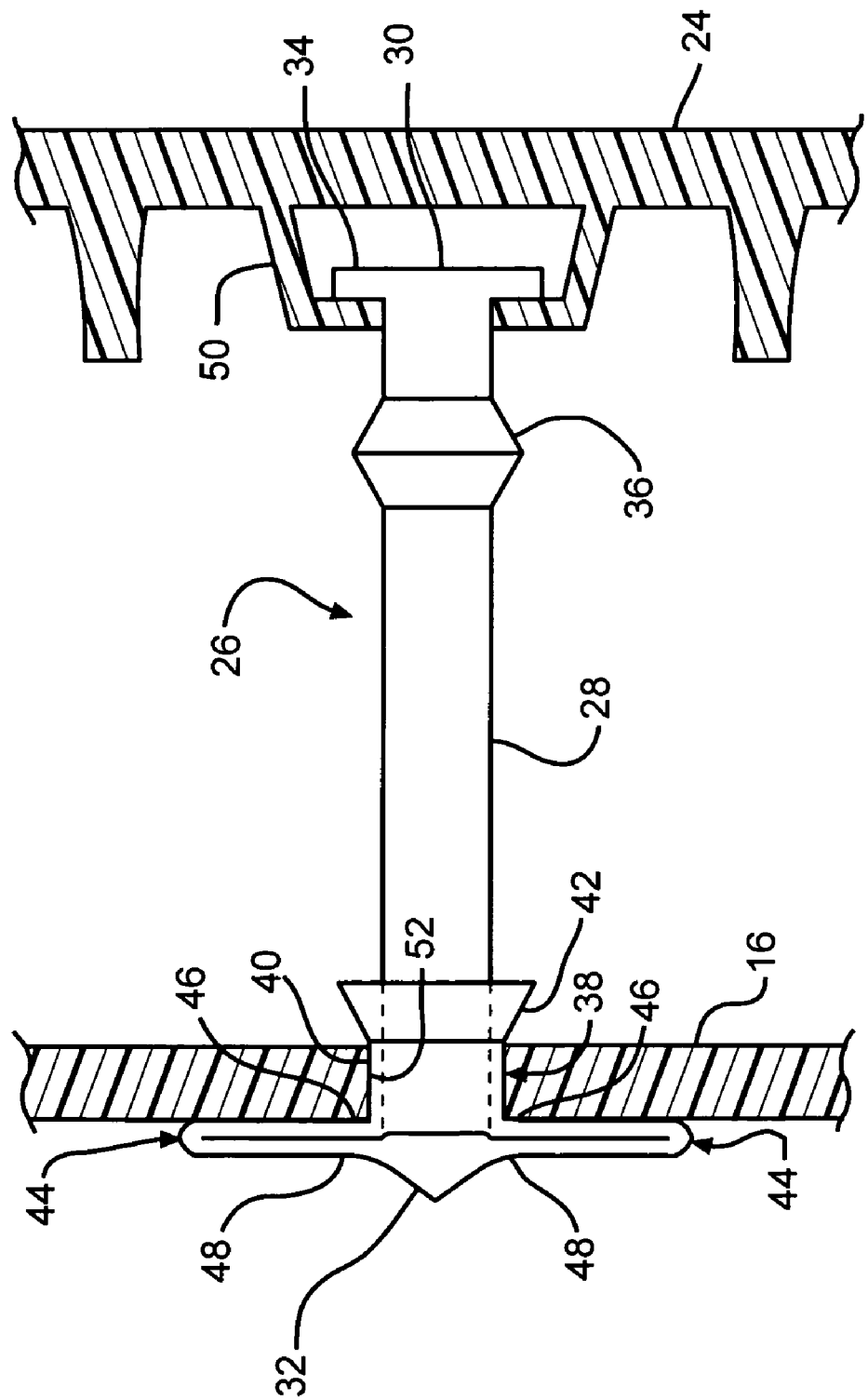
FIG. 5 is a view similar to FIG. 3, except showing the trim fastener in the extended position.

Once the arms 44 are fully extended, the collar 38 will be withdrawn through the aperture 52 and the arms 44 will engage the frame member 16 to retain the trim panel 2, as shown in FIG. 5, and act as a secondary locking element. The fastener 26 provides for generally axial movement of the trim panel 24 during deployment of the air bag 20, and thus provides consistent predictable deployment.

Depending on the size and particular configuration of the fastener 26, the present invention allows for customized distance release of the trim panel 24, and allows for sufficient opening for deployment of the air bag.

The present invention provides for the desired release and retention of the trim panel 24 during a deployment. The present invention also provides for consistent results across varied installations.

The trim panel 24 is released from the vehicle structure, e.g. Frame member 16, to create a suitable opening for the air bag to deploy through with consistent and reliable deployments.

While the principle and mode of operation of this invention have been explained and illustrated with regard to particular embodiments, it must be understood, however, that this invention may be practiced otherwise than as specifically explained and illustrated without departing from its spirit or scope.

What is claimed is:

1. A fastener for normally retaining a trim panel in a first position relative to a vehicle frame member and for allowing the trim panel to be moved away from the vehicle frame member to a second position relative to the vehicle frame member, the fastener comprising:

a shank having a first end and a second end, said first end adapted to be connected to a trim panel and said second end adapted to be inserted into an opening provided in a vehicle frame member;

a primary locking element attached to said shank and operable to cooperate with the opening in the vehicle frame member for normally retaining the trim panel in a first position relative to the vehicle frame member, said primary locking element configured to release from the opening when a sufficient force is applied to the trim panel and thereby allow the trim panel to be moved away from the vehicle frame member to a second position relative to the vehicle frame member; and a secondary locking element attached to said shank for retaining the trim panel in the second position relative to the vehicle frame member, said secondary locking element retaining said second end of said shank in the opening in the vehicle frame member and supporting the trim panel in the second position after said primary locking element has been released.

2. The fastener of claim 1 wherein said primary locking element is an annular flange.

3. The fastener of claim 1 wherein said secondary locking element is at least one arm having first and second ends, said first end connected to said shank at or near the second end of said shank.

4. The fastener of claim 3 further comprising a collar slidably disposed about said shank between said primary locking element and said second end of said shank.

5. The fastener of claim 4 wherein said second end of said arm is connected to said collar.

6. The fastener of claim 5 wherein said collar has an enlarged diameter base.

7. The fastener of claim 5 wherein said collar includes a truncated conical portion.

8. The fastener of claim 1 wherein said first end of said shank includes a shank head.

9. The fastener of claim 1 wherein said collar includes a truncated conical portion.

10. The fastener of claim 1 wherein said trim panel connector is a head.

11. The fastener of claim 1 wherein said collar has an enlarged diameter base.

12. A fastener for normally retaining a trim panel in a first position relative to a vehicle frame member and for allowing the trim panel to be moved away from the vehicle frame member to a second position relative to the vehicle frame member, the fastener comprising:
- a shank having a first end and a second end;
- a trim panel connector fixed to said first end of said shank;
- a vehicle frame member having an opening that receives said second end of said shank for sliding movement relative thereto;
- a flange fixed about said shank between said first end and said second end and engage able with said vehicle frame member to normally retain said trim panel in a first position relative to said vehicle frame member and to allow said trim panel to be moved away from said vehicle frame member to a second position relative to said vehicle frame member;
- a collar slidably disposed about said shank between said flange and said second end; and
- at least one arm having a first end and a second end, said first end of said arm connected to said collar and said second end of said arm connected to said shank near or at said second end of said shank, said collar being engage able with said vehicle frame assembly when said trim panel is moved to the second position to move said arm to an extended position to retain said trim panel in the second position relative to said vehicle frame member.

13. A fastener for normally retaining the trim panel in a first position relative to a vehicle frame member and for allowing the trim panel to be moved away from the vehicle frame member to a second position relative to the vehicle frame member, the fastener comprising:
- a shank having a first end that is adapted to be connected to a trim panel and a second end that is adapted to extend through an opening of a vehicle frame member so as to support the trim panel for movement relative to the vehicle frame member;
- a primary locking element provided on the shank and adapted to be engage able with the vehicle frame member to normally retain the trim panel in a first position relative to the vehicle frame member and to allow the trim panel to be moved away from the vehicle frame member toward a second position relative to the vehicle frame member; and
- a secondary locking element provided on the shank and adapted to be responsive to movement of the trim panel away from the first position for retaining the trim panel in the second position relative to the vehicle frame member.

\* \* \* \* \*